(12) United States Patent
Jablonski et al.

(10) Patent No.: US 11,361,559 B2
(45) Date of Patent: Jun. 14, 2022

(54) SYSTEM AND METHOD FOR CARGO MANAGEMENT IN A MOTOR VEHICLE

(71) Applicant: GM Global Technology Operations LLC, Detroit, MI (US)

(72) Inventors: Robert C Jablonski, Rochester Hills, MI (US); Ki Hyun Ahn, Troy, MI (US); Joseph F Szczerba, Grand Blanc, MI (US); Spencer W Chamberlain, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 295 days.

(21) Appl. No.: 16/686,961

(22) Filed: Nov. 18, 2019

(65) Prior Publication Data

US 2021/0150234 A1 May 20, 2021

(51) Int. Cl.
| | |
|---|---|
| *G06K 9/00* | (2022.01) |
| *G06V 20/59* | (2022.01) |
| *G06T 7/73* | (2017.01) |
| *G06Q 50/30* | (2012.01) |
| *G01C 21/34* | (2006.01) |
| *G06Q 10/02* | (2012.01) |
| *G06T 17/10* | (2006.01) |

(52) U.S. Cl.
CPC ......... *G06V 20/59* (2022.01); *G01C 21/3438* (2013.01); *G06Q 10/02* (2013.01); *G06Q 50/30* (2013.01); *G06T 7/75* (2017.01); *G06T 17/10* (2013.01)

(58) Field of Classification Search
CPC .. G06F 16/1805; G06F 16/2379; G06F 9/542; G01C 21/3438; G06Q 10/02; G06Q 50/30; G06Q 10/08; G06Q 50/28; G06T 17/10; G06T 7/75; G06K 9/00832; G01S 17/89; G01S 17/023
USPC .......................................... 382/103
See application file for complete search history.

(56) References Cited

U.S. PATENT DOCUMENTS

| | | |
|---|---|---|
| 2014/0120887 A1 | 5/2014 | Huang |
| 2019/0114577 A1* | 4/2019 | Kilburn .................. G06F 9/542 |

FOREIGN PATENT DOCUMENTS

CN          103516737 A        1/2014

* cited by examiner

Primary Examiner — Phuoc H Doan
(74) Attorney, Agent, or Firm — Vivacqua Crane PLLC (57) ABSTRACT

A method for cargo management in a motor vehicle includes identifying the motor vehicle. The method gathers dimensional information of at least one object and gathers internal dimensions of a volume within the motor vehicle. The dimensional information of the at least one object is compared to the internal dimensions of the volume, and feedback is provided to a user. The feedback is one of: yes, the at least one object will fit; or no, the at least one object will not fit.

17 Claims, 6 Drawing Sheets

SYSTEM AND METHOD FOR CARGO MANAGEMENT IN A MOTOR VEHICLE

INTRODUCTION

The present disclosure relates to motor vehicles and more specifically to management of motor vehicle cargo.

Motor vehicles are frequently used to transport human, animal, and inanimate cargo. In order for all such cargo to be transported in a given motor vehicle, it is necessary for the user to ascertain the relative sizes of the cargo items and the cargo compartment or compartments in which the cargo items are to be carried. That is, the cargo items have to fit within the cargo compartment of the motor vehicle in order for the cargo items to be transported within the motor vehicle. Users wishing to transport cargo items often attempt to fit the cargo items into the cargo compartment in a trial-and-error technique, however this can be time-consuming and can cause damage to the cargo items, the cargo compartment, or both. To limit some of the potential for damage, some users may choose to physically measure the dimensions of the cargo compartment, including the cargo compartment opening and the dimensions of the cargo items and determining whether the cargo items are smaller than the dimensions of the cargo compartment. Even when the user measures both the cargo compartment and the cargo items, complications may arise when a plurality of cargo items are to be carried in the motor vehicle along with other people and/or pets.

Thus, while current cargo management systems and methods achieve their intended purpose, there is a need for a new and improved system and method for cargo management in motor vehicles that reduces user effort and frustration while increasing the efficiency with which a user can pack one or more cargo items into the cargo compartment of a motor vehicle.

SUMMARY

According to several aspects of the present disclosure, a method for cargo management in a motor vehicle includes identifying the motor vehicle. The method further includes gathering dimensional information of at least one object and gathering internal dimensions of a volume within the motor vehicle. The method further includes comparing the dimensional information of the at least one object to the internal dimensions of the volume and providing feedback to a user. The feedback is one of: yes, the at least one object will fit; or no, the at least one object will not fit.

In another aspect of the present disclosure identifying the motor vehicle further includes gathering motor vehicle ownership information and assigning the motor vehicle to the user.

In yet another aspect of the present disclosure assigning the motor vehicle to the user further includes utilizing a rideshare application to access a rideshare database having a plurality of reservable motor vehicles. Assigning the motor vehicle to the user further includes determining which of the reservable rideshare vehicles has a volume that can accommodate the one or more objects and offering the user a selection of available rideshare vehicles that have a volume capable of fitting the at least one object. Assigning the motor vehicle to the user further includes reserving a rideshare vehicle based on the volume within the rideshare vehicle and the dimensions of the one or more objects.

In yet another aspect of the present disclosure providing feedback to a user further includes providing the user details of placement of the at least one object within the volume when the feedback is yes.

In yet another aspect of the present disclosure providing feedback further includes providing the user details of placement of at least a portion of the at least one object within the volume when the feedback is no.

In yet another aspect of the present disclosure gathering dimensional information of at least one object further includes gathering dimensions of the at least one object from photographic or video data of the one or more objects. The photographic or video data is captured by a camera; and a three-dimensional model of the at least one object is created.

In yet another aspect of the present disclosure gathering dimensional information of at least one object further includes comparing photographic or video data of the at least one objects to photographic or video data of a plurality of objects in a database. The at least one object is matched to one of the plurality of objects in the database; and dimensions of the at least one object are obtained from the database.

In yet another aspect of the present disclosure the method further includes determining a current location of a user by: triangulating the current location of the user with cellular tower data; locating the user with a global positioning system; and pre-selecting a subset of the plurality of objects in the database based on the current location of the user.

In yet another aspect of the present disclosure gathering dimensional information of at least one object further includes reading encoded information for the at least one object. The at least one object is identified based on the encoded information. Measurements of the at least one object are then obtained. An indication is provided to the user that the at least one object will fit within the motor vehicle.

In yet another aspect of the present disclosure comparing the dimensional information of the at least one object to the internal dimensions of the volume further includes generating all possible permutations of configurations of the at least one object. The permutations of configurations are compared to the internal dimensions of the volume; and instructions are provided to the user of a configuration of the at least one object within the volume.

In yet another aspect of the present disclosure gathering internal dimensions of a volume within the motor vehicle further includes determining a quantity of passengers in the motor vehicle; and actively adjusting physical parameters of the volume based on the quantity of passengers and a configuration of movable components of an interior of the motor vehicle.

In yet another aspect of the present disclosure a system for cargo management in a motor vehicle includes a camera, a controller in communication with the camera. The controller has: a memory for storing computer executable program code; and a processor configured to execute the computer executable program code. The computer executable program code includes: a first computer executable program code portion for identifying the motor vehicle, a second computer executable program code portion for gathering dimensional information of at least one object, and a third computer executable program code portion for gathering internal dimensions of a volume within the motor vehicle. The computer executable program code further includes a fourth computer executable program code portion for comparing the dimensional information of the at least one object to the internal dimensions of the volume, and a fifth computer executable program code portion for providing feedback to a user. The feedback is one of: yes, the at least one object will fit; or no, the at least one object will not fit.

In yet another aspect of the present disclosure the first computer executable program code portion further includes a computer executable program code portion for gathering motor vehicle ownership information. The first computer executable program code portion further includes a computer executable program code portion for assigning the motor vehicle to the user. The computer executable program code portion for assigning the motor vehicle to the user includes: a computer executable program code portion for utilizing a rideshare application to access a rideshare database having a plurality of reservable motor vehicles; a computer executable program code portion for determining which of the reservable rideshare vehicles has a volume that can accommodate the one or more objects; and a computer executable program code portion for offering the user a selection of available rideshare vehicles that have a volume capable of fitting the at least one object. The first computer executable program code portion further includes a computer executable program code portion for selectively reserving a rideshare vehicle based on the volume within the rideshare vehicle and the dimensions of the one or more objects.

In yet another aspect of the present disclosure the fifth computer executable program code portion further includes: a computer executable program code portion for providing the user details of placement of the at least one object within the volume when the feedback is yes. The fifth computer executable program code portion further includes a computer executable program code portion for providing the user details of placement of at least a portion of the at least one object within the volume when the feedback is no.

In yet another aspect of the present disclosure the second computer executable program code portion further includes: a computer executable program code portion for gathering dimensions of the at least one object from photographic or video data of the one or more objects. The photographic or video data is captured by a camera. The second computer executable program code portion further includes a computer executable program code portion comparing photographic or video data of the at least one objects to photographic or video data of a plurality of objects in a database. A computer executable program code portion matches the at least one object to one of the plurality of objects in the database. A computer executable program code portion obtains dimensions of the at least one object from the database; and a computer executable program code portion constructs a three-dimensional model of the at least one object.

In yet another aspect of the present disclosure a system for cargo management in a motor vehicle further includes a computer executable program code portion for determining a current location of a user by: executing a computer executable program code portion for triangulating the current location of the user with cellular tower data. The system executes a computer executable program code portion locating the user with a global positioning system and executes a computer executable program code portion for pre-selecting a subset of the plurality of objects in the database based on the current location of the user.

In yet another aspect of the present disclosure the second computer executable program code portion further includes: a computer executable program code portion for reading encoded information for the at least one object, and a computer executable program code portion for identifying the at least one object based on the encoded information. The second computer executable program code portion further includes a computer executable program code portion for obtaining measurements of the at least one objects; and a computer executable program code portion for indicating to a user that the at least one object will fit within the motor vehicle.

In yet another aspect of the present disclosure the fourth computer executable program code portion further includes: a computer executable program code portion for generating all possible permutations of configurations of the at least one object, and a computer executable program code portion for comparing the permutations of configurations to the internal dimensions of the volume. The fourth computer executable program code portion further includes a computer executable program code portion for providing instructions to the user of a configuration of the at least one object within the volume.

In yet another aspect of the present disclosure the third computer executable program code portion further includes: a computer executable program code portion for determining a quantity of passengers in the motor vehicle; and a computer executable program code portion for actively adjusting physical parameters of the volume based on the quantity of passengers and a configuration of movable components of an interior of the motor vehicle.

In yet another aspect of the present disclosure a method for cargo management in a motor vehicle includes gathering motor vehicle ownership information and assigning the motor vehicle to the user based on the motor vehicle ownership information. The method further includes gathering dimensions of the at least one object from photographic data, video data, or encoded information for the one or more objects. The photographic or video data is captured by a camera. The method further includes constructing a three-dimensional model of the at least one object and comparing the dimensional information of the at least one object to the internal dimensions of the volume. To compare the dimensional information to the internal dimensions, the method determines a quantity of passengers in the motor vehicle; and actively adjusts physical parameters of the volume based on the quantity of passengers and a configuration of movable components of an interior of the motor vehicle. The method further includes generating all possible permutations of configurations of the at least one object within the volume and comparing the permutations of configurations to the internal dimensions of the volume and providing feedback to a user. The feedback is one of: yes, the at least one object will fit; or no, the at least one object will not fit. The method provides detailed instructions to the user of a configuration of the at least one object within the volume when the feedback is yes, and provides detailed instructions to the user of a configuration of at least a portion of the at least one object within the volume when the feedback is no.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
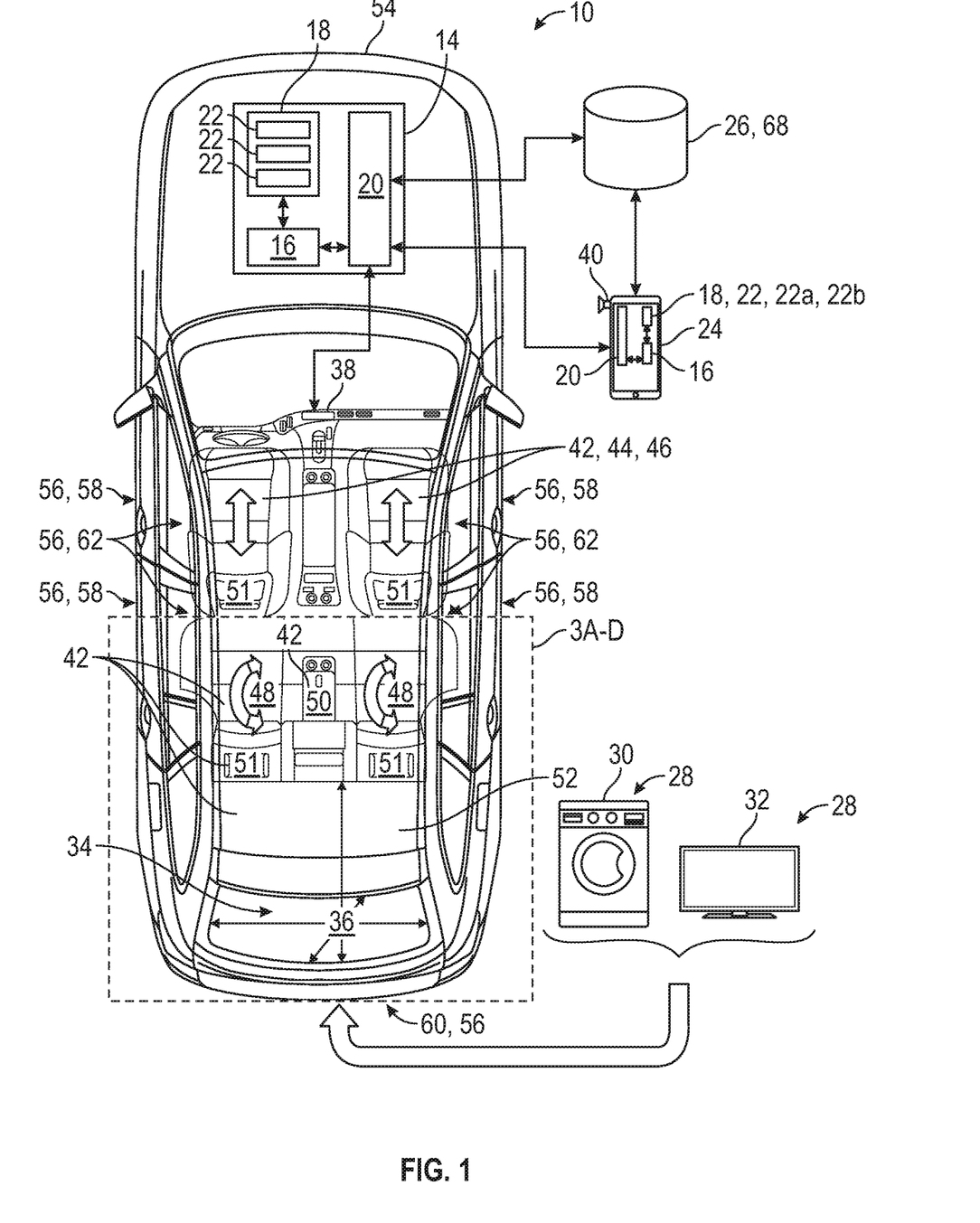
FIG. 1 is a schematic view of a system and method for cargo management in a motor vehicle according to an exemplary embodiment.

Referring to FIG. 1, a system 10 for cargo management in a motor vehicle 12 is shown. The system 10 includes one or more controllers 14. Each controller 14 is a non-generalized, electronic control device having a preprogrammed digital computer or processor 16, memory or non-transitory computer readable medium 18 used to store data such as control logic, software applications, instructions, computer code, data, lookup tables, etc., and a transceiver or input/output (I/O) ports 20. Computer readable medium includes any type of medium capable of being accessed by a computer, such as read only memory (ROM), random access memory (RAM), a hard disk drive, a compact disc (CD), a digital video disc (DVD), or any other type of memory. A "non-transitory" computer readable medium 18 excludes wired, wireless, optical, or other communication links that transport transitory electrical or other signals. A non-transitory computer readable medium 18 includes media where data can be permanently stored and media where data can be stored and later overwritten, such as a rewritable optical disc or an erasable memory device. Computer code includes any type of computer executable program code or program code portion, including source code, object code, and executable code. The processor 16 is configured to execute the code or instructions. Where the controller 14 is a motor vehicle 12, the controller 14 may be a dedicated Wi-Fi controller or an engine control module, a transmission control module, a body control module, an infotainment control module, etc. The I/O ports 20 are configured to wirelessly communicate with remote computing devices such as tablet computers, cellular phones, home computers, and the like using Wi-Fi protocols under IEEE 802.11x, and/or via cellular networks, and/or via ethernet or other networked communication systems or protocols.

The controller 14 further includes one or more applications 22. An application 22 is a software program configured to perform a specific function or set of functions. The application 22 may include one or more computer programs, software components, sets of instructions, procedures, functions, objects, classes, instances, related data, or a portion thereof adapted for implementation in a suitable computer readable program code. The applications 22 may be stored within the memory 18 or in additional or separate memory, including but not limited to memory 18 within a mobile device 24, cloud server or database 26, or the like. Examples of the applications 22 include audio or video streaming services, games, browsers, social media, augmented reality applications 22a, or the like.

Figure 2:
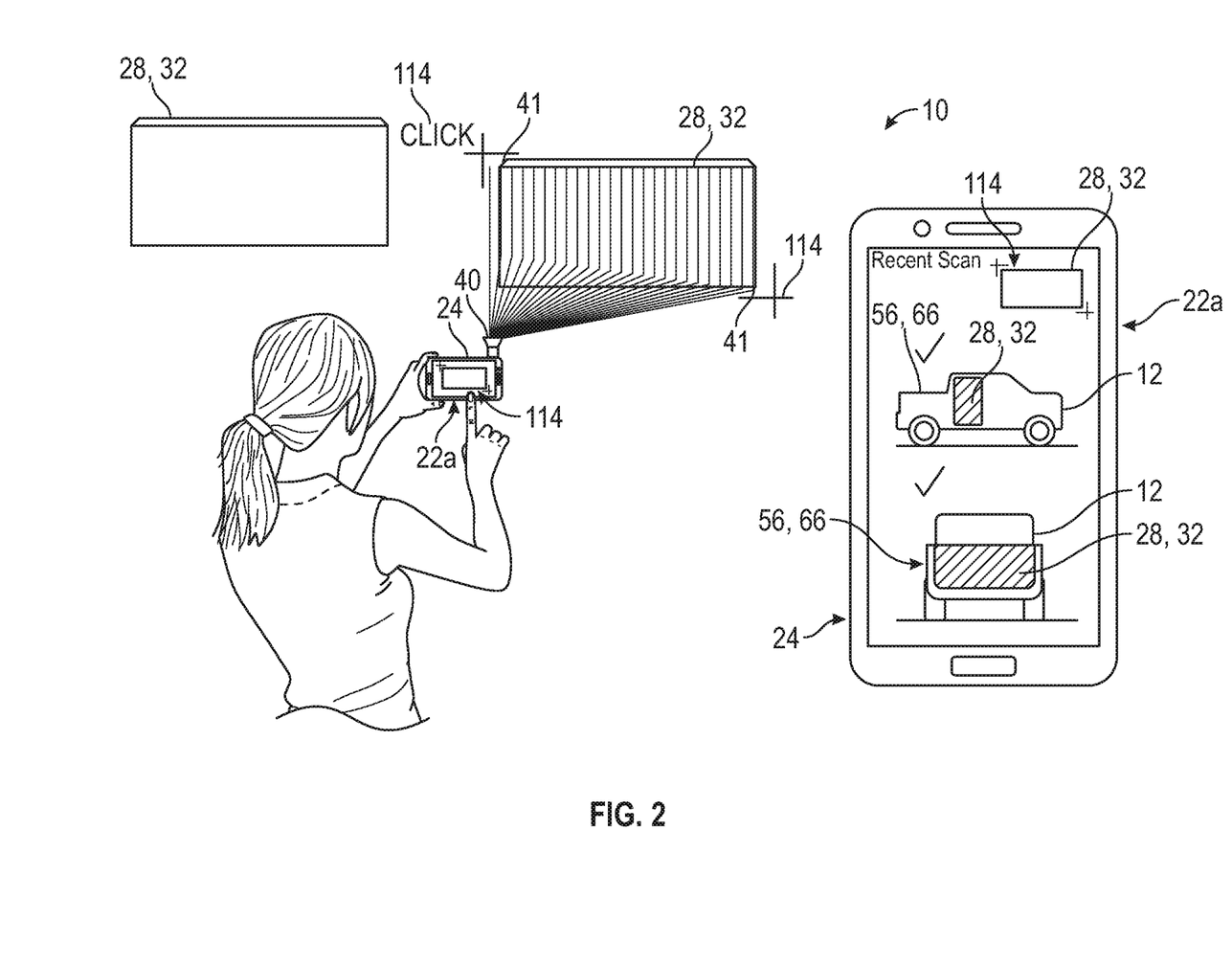
FIG. 2 is a schematic view of a user accessing a portion of the system and method for cargo management in a motor vehicle according to an exemplary embodiment.
Figure 3A:
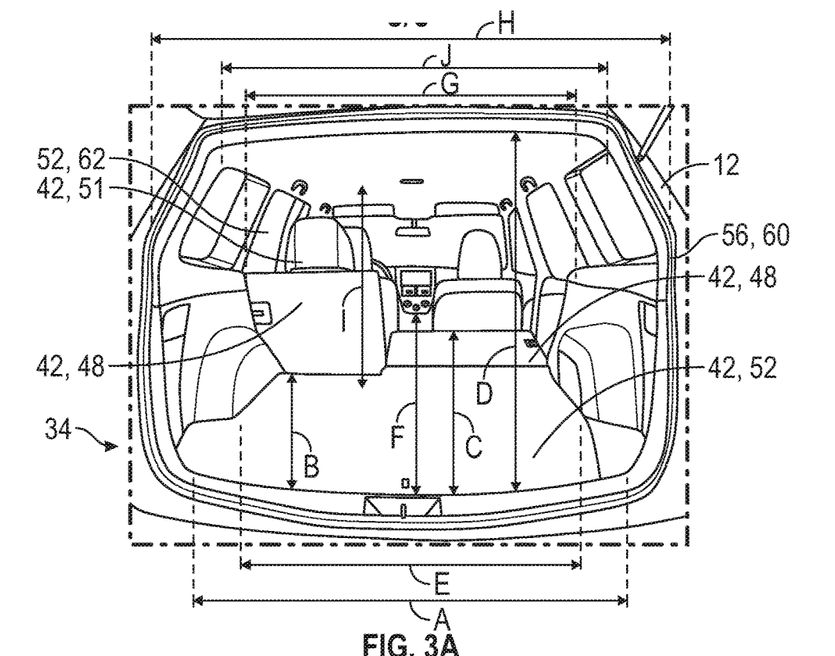
FIG. 3A is a perspective view of a portion of the motor vehicle of FIG. 1 denoted by box 3A-D for use in the system and method for cargo management according to an exemplary embodiment.
Figure 3B:
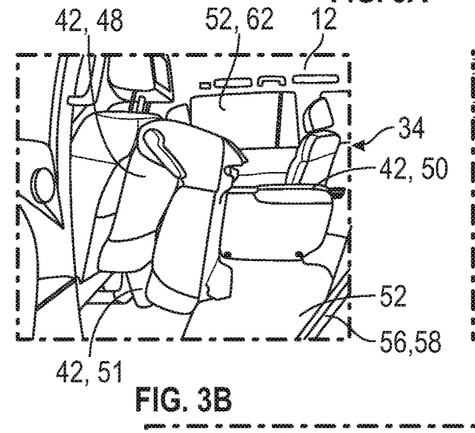
FIG. 3B is a perspective view of a portion of the motor vehicle of FIG. 1 denoted by box 3A-D for use in the system and method for cargo management according to an exemplary embodiment.
Figure 3C:
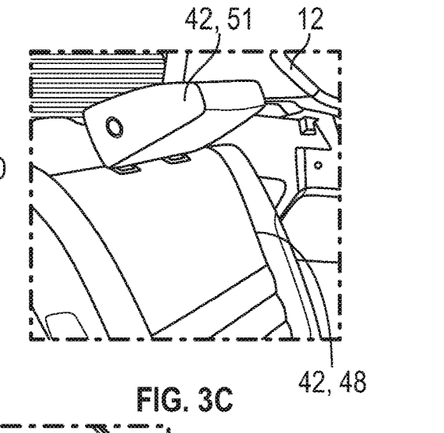
FIG. 3C is a perspective view of a portion of the motor vehicle of FIG. 1 denoted by box 3A-D for use in the system and method for cargo management according to an exemplary embodiment.
Figure 3D:
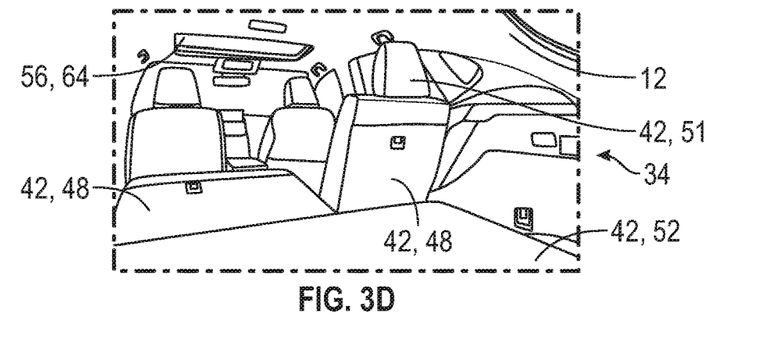
FIG. 3D is a perspective view of a portion of the motor vehicle of FIG. 1 denoted by box 3A-D for use in the system and method for cargo management according to an exemplary embodiment.

Referring now to FIG. 2 and with continuing reference to FIG. 1, a motor vehicle 12 user may wish to use the motor vehicle 12 to transport a variety of objects 28. In an example, the user purchases one or more objects 28, such as a washing machine 30 or television (TV) 32 from a store. In order to transport the washing machine 30, the user has to determine whether the washing machine 30, TV 32, or the like will fit within a cargo compartment 34 having a known volume 36 within the motor vehicle 12. In some examples the user may wish to transport objects 28 that will not fit all within the cargo compartment 34 within the motor vehicle 12. In order to aid the user in determining whether the objects 28 will fit within the cargo compartment 34, the user accesses an application 22 that ascertains whether the objects 28 will fit. The application 22 may be accessed in a variety of different ways including, but not limited to: an app or application 22 installed on a user's mobile device 24, a software program on a tablet, desktop, or laptop computer, or installed on an infotainment system 38 within the motor vehicle 12. Once the user has accessed the application 22 and provided certain inputs which will be described in further detail below, the processor 16 executes computer executable program code portions stored in memory 18 of the controller 14. In an example, the computer executable program code portions make a determination as to whether the objects 28 will fit, and notifies and/or instructs the user as to whether the objects 28 will fit. However, it should be appreciated that the computer executable program code portions may include a variety of other functions without departing from the scope or intent of the present disclosure.

In order to determine whether the objects 28 will fit within a given motor vehicle 12, the controller 14 first identifies the motor vehicle 12. Motor vehicle 12 identification can be achieved in several different ways. In an example, the controller 14 gathers motor vehicle 12 ownership information. The ownership information is collected from at least one of: an electronic association between a car key, a key fob, cellular device or the like, and an ignition or security control module within the motor vehicle 12. In some aspects, the electronic association between the car key, key fob, or cellular device is carried out via wireless communication between the car key, key fob, or cellular device. The wireless communication may be of a variety of different types, such as near field communications (NFC), wireless protocols such as 802.1X, bluetooth communications, or the like. In another example, the controller 14 gathers motor vehicle 12 ownership information through known biometrics of the user, such as finger, palm, or wrist-print recognition, retinal scan, facial recognition, or other such biometric data of the user. The user's or owner's biometric data may be captured by any of a variety of different means, such as sensors or scanners disposed on or within the motor vehicle, or scanners on a user's or owner's mobile device 24, car key, or key fob, or other known biometric scanning means. In another example, the user's biometric data is collected by a motor vehicle 12 dealership or motor vehicle 12 manufacturer and stored in a cloud-based computing system or database 26. The motor vehicle 12 then wirelessly accesses or retrieves the biometric information from the cloud-based computing system or database to ascertain whether a particular user or owner is assigned to the motor vehicle 12.

The controller 14 also executes a computer executable program code portion that gathers dimensional information of the at least one object 28. The dimensional information is gathered in at least one of several different ways. For example, the user is prompted by the controller 14 to gather or capture photographic data of the at least one object 28 utilizing a camera 40 and an application 22 on the user's mobile device 24. In some aspects, the application 22 is an augmented reality application 22a. The augmented reality application 22a provides the user an on-screen real-time view of the object 28 as the user is capturing photographic data of the object 28.

The augmented reality application 22a superimposes any of a plurality of different measuring devices, points, lines, or the like overtop the on-screen real-time view of the object 28. In an exemplary embodiment, the user is further prompted to capture images of corners 41 of the at least one object 28. The measuring devices, points, lines, or the like assist the user in determining the locations of the corners 41, sides, or other such points of interest in the photographic data of the object 28. At least one attitude sensor, such as a gyroscopic sensor, accelerometer, or the like, captures movement of the mobile device 24 as the user photographs or captures video of the at least one object 28. Data from the attitude sensor, as well as data extracted from the images of the corners 41 of the at least one object 28 is fused together to determine the locations of corners 41 of the at least one object 28 and to construct a three-dimensional model of the at least one object 28. The three-dimensional model may be wireframe model, a surface model, a solid model, any combination thereof, or other such model of the three-dimensional shape of the at least one object 28.

In a further example, the dimensions of the at least one object 28 are gathered from a database of previously identified objects. In particular, the controller 14 executes program code portions that compare the photographic or video data collected by the user is to photographic or video data of a plurality of objects stored in the database of previously identified objects. The controller 14 executes computer executable program code portions that match the photographic or video data taken by the user to at least one object 28 in the database of previously identified objects. The database further includes dimensions of each of the previously identified objects. The controller 14 then executes a program code portion that obtains the dimensions of the at least one object 28 based on the object 28 to which the user-photographed object has been matched in the database.

In some instances, dimensional information of the at least one object 28 are accessed from a database of previously identified objects. Specifically, the controller 14 reads encoded information on the at least one object and identifies the object within the database from that encoded information. In several examples, the encoded information is one or more of: a barcode, a quick response (QR) code, an alphanumeric code or sequence, a data matrix code, a universal product code (UPC), an international article number (EAN) code, a PDF417 code and an interleaved code, or the like. The encoded information is associated with specific objects 28 within the database, and upon reading the encoded information, the controller 14 determines which of the plurality of previously identified objects in the database corresponds to the user-photographed object 28. The dimensions or measurements of the at least one object 28 are then retrieved from the database of previously identified objects, and as with earlier examples, a three-dimensional model is either retrieved from the database of previously identified objects or generated by software executed by the controller 14.

In an embodiment, the system 10 refines a subset of the database of objects 28 by determining a current location of the user. The system 10 determines the user's current location through any of a variety of different means such as: triangulating the current location with cellular tower data, utilizing a global positioning system (GPS), and/or using gyroscopic and/or accelerometer sensors within the user's mobile device 24. In some example, the controller 14 captures position data from the user's mobile device 24 or from the user's motor vehicle 12. In one example, the position data of a given motor vehicle 12 shows that the motor vehicle 12 is located in close proximity to an appliance store selling household appliances such as dishwashers, refrigerators, washing machines 30, dryers, televisions 32 and the like. The controller 14 utilizes the position of the motor vehicle 12 relative to the appliance store and determines that the user is likely to be shopping at the appliance store.

The controller 14 accesses the database of objects 28 and pre-selects or otherwise generates a subset of the database of objects 28 based on the current location of the user. The subset of the database of objects 28 includes only items sold by the particular appliance store or appliance store chain. Once the user enters the appliance store, the controller 14 utilizes the dimensions of a user-selected object, such as a dishwasher, to determine whether or not the object 28 will fit within the volume 36 of the cargo compartment 34. By refining or otherwise generating the subset of the database of objects 28, when the user selects an object 28, such as the aforementioned dishwasher, the dimensions of that object 28 are readily accessible. That is, because the search parameters have been pre-refined by generating or otherwise selecting the subset of objects 28 in the database, searches for objects 28 within the subset of objects 28 is more rapid than a similar search in the full database would be.

While in the foregoing, the location of the motor vehicle 12 has been described as proximate to an appliance store, it should be appreciated that other locations and types of stores may easily be substituted without departing from the scope or intent of the present disclosure. Furthermore, several databases have been described herein. In each case, it should be appreciated that the databases may be the entirety of the internet, the world wide web, a public or private cloud storage database 26, a locally stored database, or any other such electronically accessible database. In an example, the database of previously identified objects 28 is a locally stored or public or privately-maintained cloud server 26 hosted data repository of objects 28 which have previously been identified by the user, or by other users whose mobile devices 24 or motor vehicles 12 have previously communicated data to the cloud server 26. The objects 28 which have been previously identified may have been identified through previous use of the system 10, or through an upload from an object's 28 manufacturer or the like.

Turning now to FIGS. 3A-3D and with continuing reference to FIGS. 1 and 2, the cargo compartments 34, or portions thereof, of several motor vehicles 12 are shown. In order for the at least one object 28 to be carried within the motor vehicle 12, the dimensions of the at least one object 28 must be smaller than those of the volume 36 of the motor vehicle's 12 cargo compartment 34. Depending on the type of motor vehicle 12, the internal dimensions of the volume 36 may vary substantially. For instance, the volume 36 of the cargo compartment 34 of a cargo van or truck are substantially larger than the volume 36 of the cargo compartment 34 in a typical sedan, sport utility vehicle, or the like. As the volume 36 varies between applications, the internal dimensions of the volume 36 also vary. Accordingly, the controller 14 gathers internal dimensions of the volume 36 of the cargo compartment 34 within the motor vehicle 12. Specifically, the controller 14 retrieves a three-dimensional model of the motor vehicle's 12 cargo compartment 34 from the cloud server 26, or other such remote data store. However, the actual internal dimensions (as indicated by exemplary measurement lines A, B, C, D, E, F, G, H, I, and J in FIG. 3A) of the cargo compartment 34 may vary from the dimensions retrieved from the cloud server 26. Motor vehicle 12 interiors may be equipped with adjustable panels 42. The adjustable panels 42 may vary substantially depending on the type of motor vehicle 12. In some examples, the adjustable panels 42 include movable seats 44, such as sliding and/or folding front seats 46, folding rear seats 48, foldable armrests 50, folding headrests 51, a load floor 52 having adjustable load floor angle, or the like. Each of the adjustable panels 42 may be manipulated or moved within the motor vehicle 12 resulting in a variety of configurations of the cargo compartment 34. With each different configuration of the adjustable panels 42, movable seats 44, or the like, the volume 36 and/or the shape of the volume 36 of the cargo compartment 34 changes. In an example, a set of folding rear seats 48 is folded toward the front 54 of the motor vehicle 12 to form a cargo compartment 34 having a flat load floor 52.

The controller 14 ascertains whichever of the various configurations of the cargo compartment 34 is currently in use. Specifically, the controller 14 collects position information for each of the adjustable panels 42, movable seats 44, and other movable components of the cargo compartment 34 from a plurality of optical sensors, position sensors, weight sensors, or the like. In some examples, the controller 14 also determines possible cargo compartment 34 configurations based on a quantity of passengers (not specifically shown) in the motor vehicle 12. The controller 14 then actively adjusts the physical parameters of the volume 36 based on the quantity of passengers and configuration of the movable components of the interior of the motor vehicle 12.

Once the controller 14 has gathered the internal dimensions of the volume 36 of the cargo compartment 34, the controller 14 executes a computer executable program code portion that compares the dimensional information of the at least one object 28 to the internal dimensions of the volume 36. The internal dimensions of the volume 36 may be irregular. For example, the cargo compartment 34 of a cargo van-type motor vehicle 12 may have a shape that approximates a rectangular prism. However, the rectangular prism-shaped cargo compartment 34 may have any of a variety of different intrusions or protrusions such as: one or more rear wheel-wells, a protrusion that at least partially encapsulates a battery pack or a fuel tank, a door hinge, a windowsill, or the like (not specifically shown). Accordingly, the internal dimensions of the volume 36 include the dimensions of each of the intrusions or protrusions within the particular motor vehicle 12.

Figure 4:
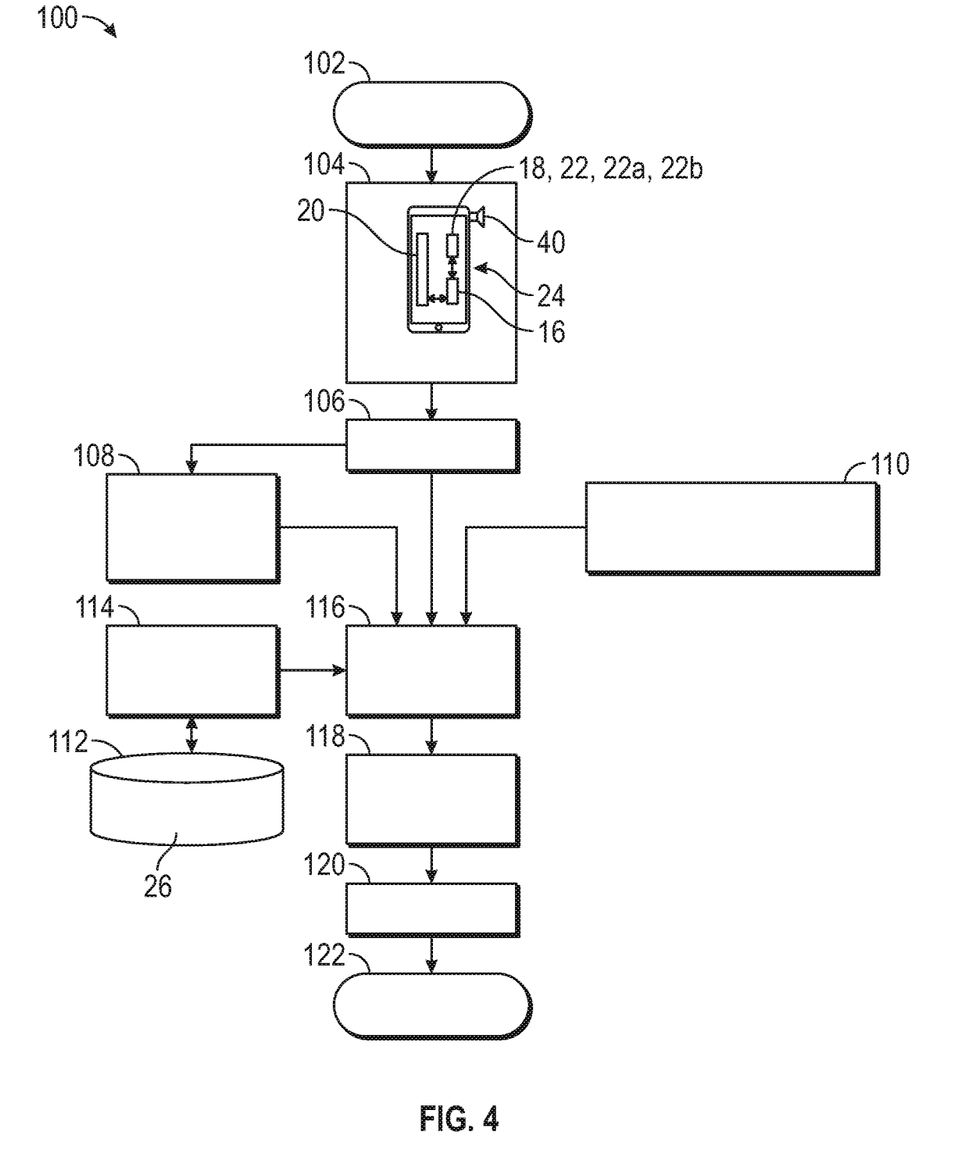
FIG. 4 is a flowchart depicting a method for cargo management in a motor vehicle utilizing augmented reality imaging according to an exemplary embodiment.

Turning now to FIG. 4 and with continuing reference to FIGS. 1-3D, a method 100 of using the augmented reality application 22a is shown in further detail. The method 100 starts at block 102. At block 104, the augmented reality application 22a is accessed through the user's mobile device 24, or other such interface. The augmented reality application 22a is hosted or stored in the memory 18 of the user's mobile device 24, the infotainment system 38 within the motor vehicle 12, a user's computer, or in a remote computing platform such as a remote server. The user then utilizes a camera 40 on the mobile device 24 to capture a real-time image of the object or objects 28 to be carried within the cargo compartment 34 at block 106.

At block 108, the augmented reality application 22a performs video tracking and/or registration of the object 28 within the image. Specifically, augmented reality application 22a aligns or corrects the alignment of the object or objects 28 within the real-time image to more accurately predict or calculate the object's 28 dimensions. The video tracking and/or registration is performed via computerized vision algorithms, or the like. At block 110, the augmented reality application 22a uses one or more positioning sensors such as a global positioning system (GPS), and/or using gyroscopic and/or accelerometer sensors within the user's mobile device 24 to calculate the dimensions of the object or objects 28 to be carried.

At block 112, the augmented reality application 22a accesses a cloud server or database 26 to retrieve a virtual component 114 for a three-dimensional rendering. In an example, the virtual component 114 consists of a virtual ruler or other on-screen measuring device. At block 116, the augmented reality application 22a combines the video tracking and/or registration data, the positioning sensor data, and the image itself to generate the three-dimensional rendering of the object or objects 28. The virtual component 114 is then overlaid overtop the three-dimensional rendering of the object or objects 28. More specifically, the alignment of the virtual component 114 relative to the object or objects 28 is corrected onto the appropriate real object 28 in the visual scene captured in the real-time image. In some examples, the augmented reality application 22a utilizes artificial intelligence algorithms, computer learning, or the like to enable the system 10 to understand the meaning or presence of objects 28 within the real-time image to further enhance the registration and/or video tracking of the objects 28.

At block 118, the augmented reality application 22a generates an augmented reality image including the three-dimensional rendering and the virtual component 114. At block 120, the augmented reality image with the three-dimensional rendering and virtual component 114 is displayed on the user's mobile device 24 or other such display. At block 122, the method 100 ends. The method 100 may be repeated for each additional object 28 imaged by the user.

Figure 5:
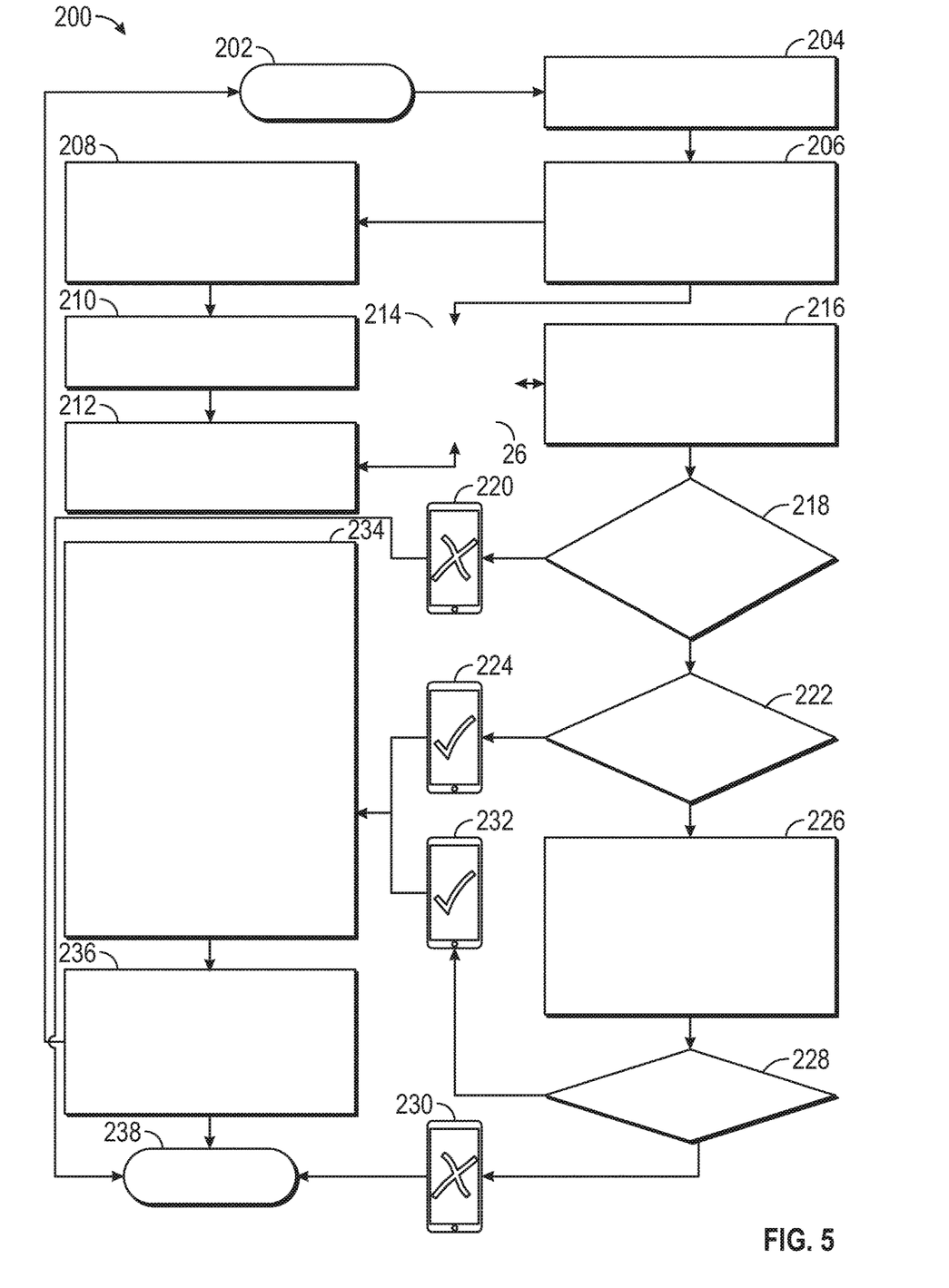
FIG. 5 is a flowchart depicting a second method for cargo management in a motor vehicle according to another exemplary embodiment.

Turning now to FIG. 5, and with continuing reference to FIGS. 1-4, a method 200 for cargo management in a motor vehicle 12 is shown in further detail. The method 200 begins at block 202 where the user accesses the application 22 stored in memory 18 of the controller 14. At block 204, the application 22 identifies the object 28 to be placed in the motor vehicle 12. The identification procedures have been and will be described in further detail herein. At block 206, the application 22 utilizes a camera 40 on the user's mobile device 24 to capture an image of the object 28. In some examples, the image of the object 28 may be selected in an online store when the user selects the object 28 for purchase. Accordingly, the image may also be retrieved from an online database. When a camera 40 is used to capture the image of the object 28, the method 200 proceeds to block 208. At block 208, a software application on the mobile device 24 identifies the object 28 and obtains dimensions of the object 28 as described above. The method 200 then proceeds to block 210 where the application 22 generates a three-dimensional model of the object 28. At block 212, the application 22 manipulates the three-dimensional model of the object 28 to ascertain whether the object 28 will fit into the cargo compartment 34 of the motor vehicle 12. In order to determine the various configurations of the object 28 within the cargo compartment 34, the application 22 accesses a cloud server 26 or other such remote data storage at block 214. The cloud server 26 hosts cargo compartment 34 volume 36 and dimensional information for any number of motor vehicles 12. At block 216, the application 22 utilizes the dimensional information of the object 28 and the cargo compartment 34 volume 36 information from the cloud server 26 to generate all possible permutations of configurations of the object 28 within the volume 36 of the cargo compartment 34. In instances where the user intends to carry a plurality of objects 28 within the cargo compartment 34, the application 22 generates all possible permutations of the plurality of objects 28 within the cargo compartment 34. The permutations include all possible orientations of each of the plurality of objects 28 individually within the volume 36, as well as all possible configurations of the plurality of objects 28 relative to one another and in combination with one another within the volume 36.

At block 218, the application 22 utilizes body opening 56 measurements to ascertain whether the object 28 or objects 28 can fit through one or more of the body openings 56 of the motor vehicle 12 and provides feedback to the user. Depending on the type of motor vehicle 12, the types and sizes of the body openings 56 may vary substantially. In some examples, the body openings 56 include door openings 58, rear hatch or trunk openings 60, window openings 62, sunroofs 64, truck beds 66, or the like. The application 22 then provides feedback to the user indicating that the at least one object 28 will or will not fit within the cargo compartment 34 of the motor vehicle 12. Specifically, at block 220, if the object or objects 28 cannot fit through the body openings 56 of the motor vehicle 12, the application 22 generates a negative notification. The negative notification is displayed on the user's mobile device 24 or another such display through which the application 22 has been accessed. In an example, the negative notification is a visually and/or audibly-depicted "X", a "NO", a "Do Not Enter" or "STOP" sign or other such negative indicator. However, if the object or objects 28 can fit through the body openings 56, the method 200 proceeds to block 222.

In a first step, the application 22 informs and provides feedback to the user regarding whether or not the at least one object 28 will fit within the cargo compartment 34. More specifically, at block 222 the application 22 determines whether the object or objects 28 can fit into the volume 36 of the cargo compartment 34. The application 22 compares the dimensions of each of the objects 28 to the dimensions of the volume 36 of the cargo compartment 34. If the object or objects 28 can fit into the volume 36 of the cargo compartment 34, the application 22 generates a positive notification at block 224. The notification is displayed on the user's mobile device 24 or other such display through which the system 10 has been accessed. In an example, the positive notification is a visually and/or audibly-depicted check mark, a "YES", a plus sign, an "ENTER" or other such positive indicator.

However, if the object or objects 28 cannot fit into the volume 36 of the cargo compartment 34 at block 222, the method 200 proceeds to block 226 where the application 22 compares all of the possible permutations of the object or objects 28 to the internal dimensions of the volume 36 and provides feedback and/or instructions to the user of at least one configuration of one or more of the objects 28 within the volume 36. More generally, Whether or not the at least one object 28 fits, the application 22 provides a second step of feedback where the application 22 provides details of placement of the at least one object within the volume 36 when the feedback is positive or "yes". Likewise, the application 22 provides details of placement of at least a portion of the at least one object 28 within the volume 36 when the feedback is negative or "no". If the object 28 will not fit within the cargo compartment 34, the method 200 proceeds to block 226 where the application 22 executes computer executable program code portions that attempt all combinations of reconfigurations of the interior of the motor vehicle 12 including revising locations of known objects 28 and passengers within the motor vehicle 12. That is, the application 22 attempts to fit the object 28 into the cargo compartment 34 of the motor vehicle 12 by reconfiguring various movable components such as adjustable panels 42, movable seats 44 and the like within the cargo compartment 34. Additionally, the application 22 revises the locations of other known objects and passengers within the motor vehicle 12. When the feedback is negative or "no", and when the user intends to carry a plurality of objects 28 within the cargo compartment 34, the application 22 provides the user at least one configuration in which a subset of a plurality of objects 28 will fit within the volume 36 of the cargo compartment 34 and displays a positive notification regarding the subset of objects 28.

At block 228, the application 22 ascertains once more whether the object or objects 28 will fit within the cargo compartment 34. If the object or objects 28 still cannot fit within the cargo compartment 34, the application 22 generates a negative notification at block 230 as described above. However, if the object or objects 28 will fit within the cargo compartment 34, the method 200 proceeds to block 232 where the application 22 generates a positive notification as described above.

After the positive notification at either of blocks 224 or 232, the method 200 proceeds to block 234. At block 234, the application 22 provides feedback to the user regarding how the object or objects 28 may be loaded into the cargo compartment 34. More specifically, the application 22 provides the user with a series of user-selectable configuration options in which at least some of a plurality of objects 28 will fit within the volume 36. That is, when at least one of the objects 28 will not fit within the volume 36, the application 22 categorizes each object 28 and on the basis of that categorization, determines where the object 28 may be properly carried. For example, flat screen televisions and other such electronic devices typically do not react well to water, thermal stresses, and have weight and/or orientation limits. Accordingly, the application 22 accesses local weather information and utilizes the object categorization and weather information to determine appropriate locations for each of the objects 28 to be carried. In the example of a flat screen television, the television must be stored within the motor vehicle's 12 cargo compartment 34 in a vertical orientation without being stacked beneath other objects 28, and should not protrude from the motor vehicle 12 when the weather information indicates that rain, snow, or extreme temperatures are likely.

In some examples, the application 22 presents the user with a plurality of combinations of objects 28 that have been determined to fit within the cargo compartment 34. The user may then select and/or try each of a plurality of different combinations of objects 28 to see which objects 28 will fit within the cargo compartment 34 for each combination. Utilizing the plurality of different combinations, the user selects which of the plurality of objects 28 they will transport using the motor vehicle 12.

At block 236, the application 22 cyclically performs the procedures from blocks 202-234 until all of the objects 28 the user wishes to transport have been fit into the cargo compartment 34. The user may also use the application 22 to select a combination of objects 28 in which at least some of the objects 28 are carried on an exterior carrier of the motor vehicle 12, such as a roof rack, a trailer, or the like. Additionally, as the application 22 identifies the various objects 28 to be transported in the cargo compartment 34, the application 22 provides a visualization of a sequence of steps that will result in all selected objects 28 being stored within the cargo compartment 34 of the motor vehicle 12. In some examples, the sequence of steps is displayed on the user's mobile device 24 or another display screen as a stop-motion, or animated sequence of movements in which each of the selected objects 28 should be moved. The stop-motion or animated sequence of movements shows the user how to manipulate each of the objects 28 through a body opening 56 of the motor vehicle 12 and into a stowage position within the cargo compartment 34, thereby showing the user how to most efficiently pack the objects 28 within the cargo compartment 34. That is, for each iteration or repetition, the method 200 optimizes the orientation and/or placement of all objects 28 to be stowed with each new object 28 added.

The method 200 then proceeds from block 236 to block 238 where the method 200 ends. Likewise, from either of blocks 220 or 230, when the object or objects 28 cannot fit into the volume 36 of the cargo compartment 34, the method 200 proceeds to block 238 where the method 200 ends. For subsequent object 28 identification and/or transport, the application 22 may be accessed in substantially the same way as described above and beginning at block 202 once more.

Figure 6:
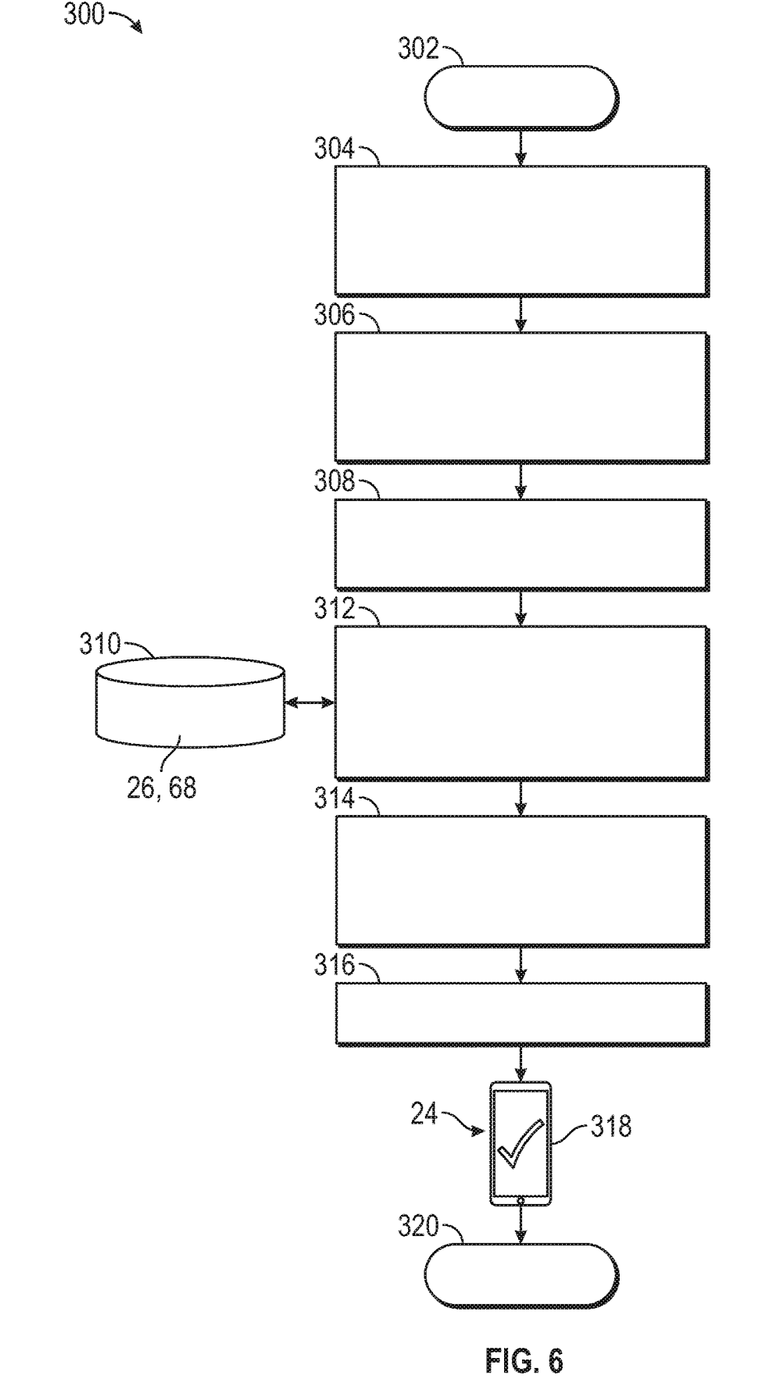
FIG. 6 is a flowchart depicting a third method for cargo management in a rideshare reservable motor vehicle according to an exemplary embodiment.

Turning now to FIG. 6 and with continuing reference to FIGS. 1-5, a method 300 for cargo management in a rideshare motor vehicle 12 is shown. Some motor vehicle 12 users do not have regular access to motor vehicles 12 except via public or private rentable transportation such as buses, limousines, taxis, and motor vehicles 12 operated in conjunction with rideshare companies. In order to transport objects 28 in a rideshare motor vehicle 12, it is helpful for the user to know that the objects 28 will fit within a given reservable motor vehicle 12. The method 300 begins at block 302 where the user accesses the rideshare application 22b. The rideshare application 22b may be accessed in a variety of ways including, but not limited to: an application 22 installed in memory 18 of a user's personal mobile device 24, or personal computer, or the like. Likewise, the rideshare application 22b may be accessed on the infotainment system 38 within a motor vehicle 12 or the like. At block 304, the rideshare application 22b prompts the user to capture an image of the objects 28 the user wishes to transport utilizing a camera 40 on the user's mobile device 24 as described above. At block 306, the method 300 utilizes an augmented reality application 22a to obtain dimensions of the objects 28 to be transported. At block 308, the controller 14 generates a three-dimensional model of the objects 28. At block 310, utilizing the rideshare application 22b, the user accesses a rideshare database 68 that includes a plurality of reservable motor vehicles 12. The rideshare database 68 is a data repository maintained and/or hosted by a rideshare company and including a plurality of reservable rideshare vehicles. At block 312, the rideshare application 22b in conjunction with the augmented reality application 22a attempt all combinations of reconfigurations of the adjustable panels 42 and other movable components of the interiors in each of the nearby reservable rideshare motor vehicles 12. At block 314, the rideshare application 22b and augmented reality application 22a determine which of the reservable rideshare motor vehicles 12 has a volume 36 with internal dimensions that can accommodate the object or objects 28. The controller 14 then offers the user a selection of available rideshare-reservable motor vehicles 12 having a volume 36 fitting the one or more objects 28. At block 316, the user selects or reserves one of the available rideshare-reservable motor vehicles 12 based on the volume 36 within the motor vehicle 12 and the dimensions of the one or more objects 28. At block 318, the rideshare application 22b indicates a successful reservation has been created by displaying a positive notification on the user's mobile device 24 or other such interface the user has used to access the rideshare application 22b and the augmented reality application 22a. In an example, the positive notification is a visually and/or audibly-depicted check mark, a "YES", a plus sign, an "ENTER" or other such positive indicator. At block 320, the method 300 ends. Additional rideshare reservations for transporting objects 28 may be run for each new trip that the user wishes to take. In each such new trip, the method 300 starts at block 302 and proceeds through block 320 as described above.

A system and method for cargo management of the present disclosure offers several advantages. These include a reduction in user effort and frustration during the packing of a motor vehicle 12 while increasing the efficiency with which the user can pack one or more cargo items or objects 28 into the cargo compartment 34 of the motor vehicle 12.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:
1. A method for cargo management in a motor vehicle, the method comprising:
identifying the motor vehicle by gathering motor vehicle ownership information and assigning the motor vehicle to a user;
gathering dimensional information of at least one object;
gathering internal dimensions of a volume within the motor vehicle;
comparing the dimensional information of the at least one object to the internal dimensions of the volume; and
providing feedback to the user, wherein the feedback to the user is one of:
yes, the at least one object will fit, or
no, the at least one object will not fit,
wherein assigning the motor vehicle to the user further includes:

utilizing a rideshare application to access a rideshare database having a plurality of reservable motor vehicles;
determining which of the reservable motor vehicles has a volume that can accommodate the at least one object;
offering the user a selection of available reservable motor vehicles that have a volume capable of fitting the at least one object; and
reserving a reservable motor vehicle based on the volume within the reservable motor vehicle and the dimensional information of the at least one object.

2. The method of claim 1 wherein providing feedback to a user further includes:
providing the user with details of placement of the at least one object within the volume when the feedback to the user is yes.

3. The method of claim 1 wherein providing feedback further includes:
providing the user with details of placement of at least a portion of the at least one object within the volume when the feedback to the user is no.

4. The method of claim 1 wherein gathering dimensional information of at least one object further includes:
gathering dimensions of the at least one object from photographic or video data of the at least one object, the photographic or video data captured by a camera; and
constructing a three-dimensional model of the at least one object.

5. The method of claim 1 wherein gathering dimensional information of at least one object further includes:
comparing photographic or video data of the at least one object to photographic or video data of a plurality of objects in a database;
matching the at least one object to one of the plurality of objects in the database; and
obtaining dimensions of the at least one object from the database.

6. The method of claim 5 further including:
determining a current location of the user by:
triangulating the current location of the user with cellular tower data;
locating the user with a global positioning system; and
pre-selecting a subset of the plurality of objects in the database based on the current location of the user.

7. The method of claim 1 wherein gathering dimensional information of at least one object further includes:
reading encoded information for the at least one object;
identifying the at least one object based on the encoded information;
obtaining measurements of the at least one object; and
indicating to the user that the at least one object will fit within the motor vehicle.

8. The method of claim 1 wherein comparing the dimensional information of the at least one object to the internal dimensions of the volume further includes:
generating all possible permutations of configurations of the at least one object;
comparing the permutations of configurations to the internal dimensions of the volume; and
providing instructions to the user of a configuration of the at least one object within the volume.

9. The method of claim 1 wherein gathering internal dimensions of a volume within the motor vehicle further includes:
determining a quantity of passengers in the motor vehicle; and
actively adjusting physical parameters of the volume based on the quantity of passengers and a configuration of movable components of an interior of the motor vehicle.

10. A system for cargo management in a motor vehicle, the system comprising:
a camera;
a controller in communication with the camera, the controller having:
a memory for storing computer executable program code; and
a processor configured to execute the computer executable program code, the computer executable program code including:
a first computer executable program code portion for identifying the motor vehicle;
a second computer executable program code portion for gathering dimensional information of at least one object;
a third computer executable program code portion for gathering internal dimensions of a volume within the motor vehicle, wherein the third computer executable program code portion further includes: a computer executable program code portion for determining a quantity of passengers in the motor vehicle; and a computer executable program code portion for actively adjusting physical parameters of the volume based on the quantity of passengers and a configuration of movable components of an interior of the motor vehicle;
a fourth computer executable program code portion for comparing the dimensional information of the at least one object to the internal dimensions of the volume; and
a fifth computer executable program code portion for providing feedback to a user, wherein the feedback to the user is one of:
yes, the at least one object will fit, or
no, the at least one object will not fit.

11. The system of claim 10 wherein the first computer executable program code portion further includes:
a computer executable program code portion for gathering motor vehicle ownership information; and
a computer executable program code portion for assigning the motor vehicle to the user, wherein the computer executable program code portion for assigning the motor vehicle to the user includes:
a computer executable program code portion for utilizing a rideshare application to access a rideshare database having a plurality of reservable motor vehicles;
a computer executable program code portion for determining which of the reservable motor vehicles has a volume that can accommodate the at least one object; and
a computer executable program code portion for offering the user a selection of available reservable motor vehicles that have a volume capable of fitting the at least one object; and
a computer executable program code portion for selectively reserving a reservable motor vehicle based on the volume within the reservable motor vehicle and the dimensions of the at least one object.

12. The system of claim 10 wherein the fifth computer executable program code portion further includes:

a computer executable program code portion for providing the user with details of placement of the at least one object within the volume when the feedback is yes; and a computer executable program code portion for providing the user with details of placement of at least a portion of the at least one object within the volume when the feedback is no.

13. The system of claim 10 wherein the second computer executable program code portion further includes:

a computer executable program code portion for gathering dimensions of the at least one object from photographic or video data of the at least one object, the photographic or video data captured by a camera;

a computer executable program code portion comparing photographic or video data of the at least one object to photographic or video data of a plurality of objects in a database;

a computer executable program code portion for matching the at least one object to one of the plurality of objects in the database;

a computer executable program code portion for obtaining dimensions of the at least one object from the database; and a computer executable program code portion for constructing a three-dimensional model of the at least one object.

14. The system of claim 13 further including:

a computer executable program code portion for determining a current location of the user by:

a computer executable program code portion for triangulating the current location of the user with cellular tower data;

a computer executable program code portion locating the user with a global positioning system; and a computer executable program code portion for preselecting a subset of the plurality of objects in the database based on the current location of the user.

15. The system of claim 10 wherein the second computer executable program code portion further includes:

a computer executable program code portion for reading encoded information for the at least one object;

a computer executable program code portion for identifying the at least one object based on the encoded information;

a computer executable program code portion for obtaining measurements of the at least one object; and a computer executable program code portion for indicating to the user that the at least one object will fit within the motor vehicle.

16. The system of claim 10 wherein the fourth computer executable program code portion further includes:

a computer executable program code portion for generating all possible permutations of configurations of the at least one object;

a computer executable program code portion for comparing the permutations of configurations to the internal dimensions of the volume; and a computer executable program code portion for providing instructions to the user of a configuration of the at least one object within the volume.

17. A method for cargo management in a motor vehicle, the method comprising:

gathering motor vehicle ownership information;

assigning the motor vehicle to a user based on the motor vehicle ownership information, and gathering dimensions of at least one object from photographic data, video data, or encoded information for the at least one object, the photographic or video data captured by a camera;

constructing a three-dimensional model of the at least one object;

comparing the dimensional information of the at least one object to internal dimensions of a volume within the motor vehicle by:

determining a quantity of passengers in the motor vehicle; and actively adjusting physical parameters of the volume based on the quantity of passengers and a configuration of movable components of an interior of the motor vehicle;

generating all possible permutations of configurations of the at least one object within the volume and comparing the permutations of configurations to the internal dimensions of the volume;

providing feedback to the user, wherein the feedback is one of:

yes, the at least one object will fit, or no, the at least one object will not fit; and providing detailed instructions to the user of a configuration of the at least one object within the volume when the feedback is yes, and providing detailed instructions to the user of a configuration of at least a portion of the at least one object within the volume when the feedback is no.

* * * * *